United States Patent [19]
Yazaki et al.

[11] 4,024,550
[45] May 17, 1977

[54] FLASH SYNCHRONIZING DEVICE FOR A CAMERA

[75] Inventors: Mutsunobu Yazaki; Noriaki Sanada, both of Yokohama; Tetsuya Taguchi, Kawasaki, all of Japan

[73] Assignee: Canon Kabushiki Kaisha, Tokyo, Japan

[22] Filed: Sept. 18, 1975

[21] Appl. No.: 614,604

[30] Foreign Application Priority Data
Sept. 26, 1974 Japan ............................ 49-111285
Sept. 26, 1974 Japan ............................ 49-111286

[52] U.S. Cl. .............................. 354/147; 354/219; 354/246
[51] Int. Cl.² ................. G03B 15/03; G03B 13/02; G03B 9/40
[58] Field of Search ......... 354/129, 139, 147, 149, 354/145, 246, 250, 252, 253, 254, 256, 261, 219

[56] References Cited
UNITED STATES PATENTS

| 3,228,315 | 1/1966 | Platt | 354/246 |
| 3,529,526 | 9/1970 | Wick et al. | 354/147 |
| 3,715,959 | 2/1973 | Harvey | 354/246 X |
| 3,872,488 | 3/1975 | Oshima | 354/246 |
| 3,900,857 | 8/1975 | Tsujimoto | 354/139 X |

FOREIGN PATENTS OR APPLICATIONS

1,198,279  7/1970  United Kingdom ............... 354/129

*Primary Examiner*—Donald A. Griffin
*Attorney, Agent, or Firm*—Toren, McGeady and Stanger

[57] ABSTRACT

A flash synchronizing device for use in a photographic camera having a two-blade type shutter comprises first and second switches series-circuited to each other and to a battery circuit for a flash tube and associated with the shutter so that the first switch is closed when the opening blade of the shutter is in a terminal position of running-down movement thereof, and the second switch is opened when the closing blade starts to running-down movement.

5 Claims, 8 Drawing Figures

FLASH SYNCHRONIZING DEVICE FOR A CAMERA

This invention relates to cameras for day-light and flash photography and more particularly to a flash synchronizing device for use in a camera having a two-blade type shutter.

In a camera having a two-blade type shutter, a flash synchro-contact and particularly X-contact must be arranged to be closed when the two shutter blades are in the fully open positions and to be opened when the exposure aperture is totally blocked by the shutter blades and further must remain open during the shutter-cocking operation. For cooperation with the shutter of the type described, therefore, the flash synchronizing device is required to have a pair of switch elements series-circuited to each other and to a flash tube, and associated so that one of the switch elements is closed when the running-down movement of the opening blade of the shutter is terminated, and the other switch element is opened when the closing blade starts to the running-down movement.

An object of the present invention is to provide a flash synchronizing device comprising first and second switch elements series-circuited to each other and to a flash tube and arranged to have a common contact.

Another object of the present invention is to provide a flash synchronizing device of the character described in which one of the contacts of the two switch element assembly which is arranged to be responsive to the attainment of the opening shutter blade to the terminal unclocking position is resilient to serve as a braking member for the shutter blades as the shutter blades run down at high speeds.

Still another object of the present invention is to provide a flash synchronizing device of the character described which serves to indicate the relative positions of the shutter blades by utilizing the fact that the two switch elements are simultaneously closed when the exposure aperture is fully unblocked, whereby the indication can be viewed by the camera operator looking through the view finder of the camera.

Other objects and features of the present invention will become apparent from the following detailed description taken in conjunction with the accompanying drawings in which.

Figure 1:
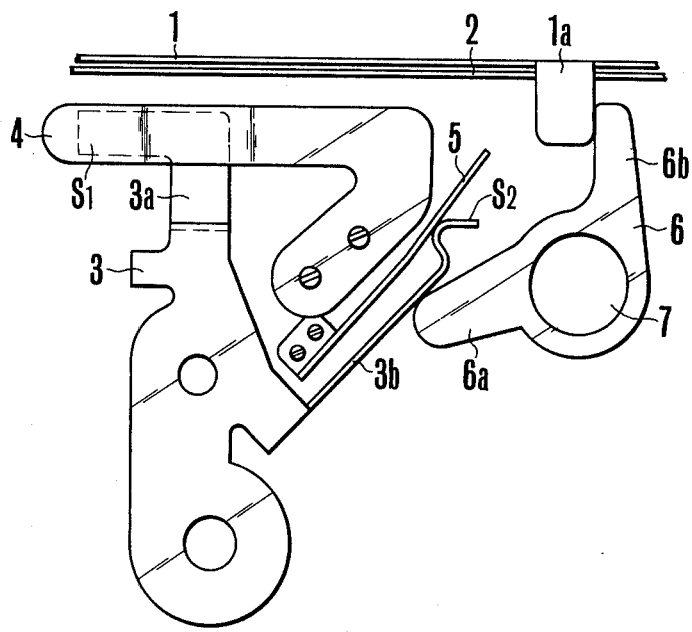
FIG. 1 is an elevational view of one embodiment of a flash synchronizing device associated with a two planar blade type shutter according to the present invention in the cocked position of the shutter.
Figure 2:
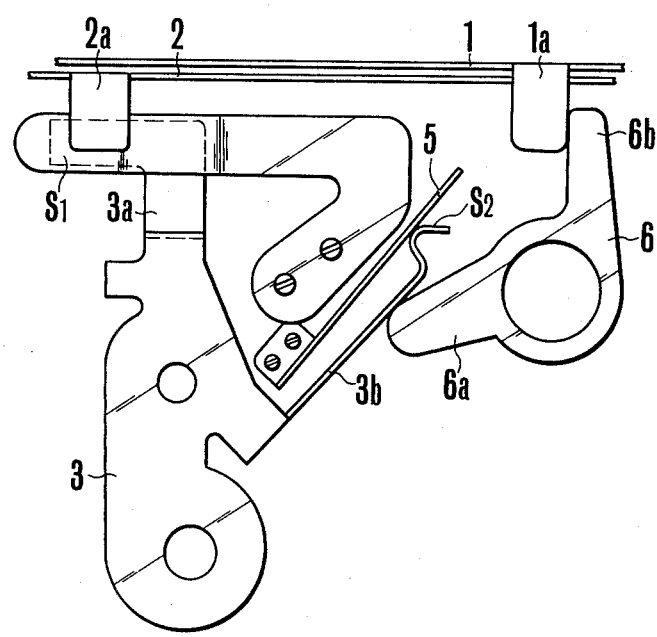
FIG. 2 is a similar view of the embodiment with the opening shutter blade being in the terminal run-down position where the exposure aperture is unblocked.
Figure 3:
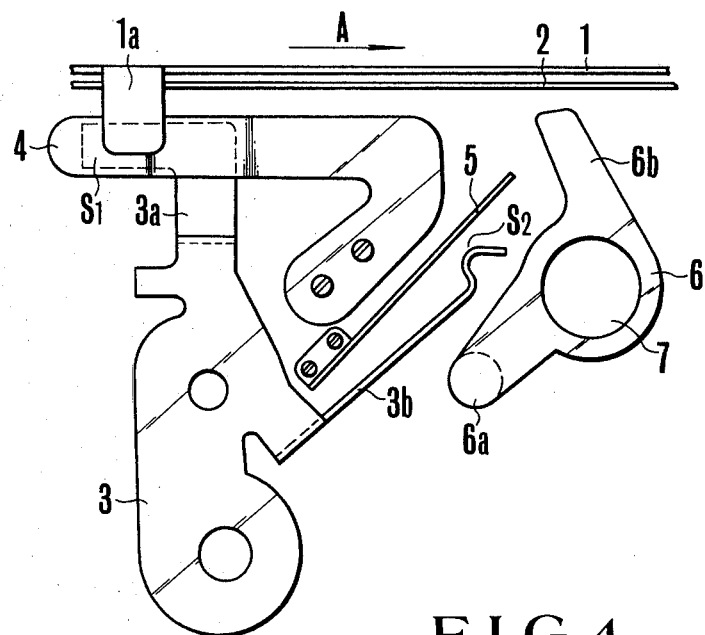
FIG. 3 is a similar view of the embodiment with the shutter being in the closed position just after exposure.

Referring now to FIGS. 1 through 4, there is shown one embodiment of a flash synchronizing device as comprising first and second switch elements $S_1$ and $S_2$ arranged to cooperate with a pair of planar, opaque shutter blades 1 and 2, which are called the "closing" and "opening" blades respectively. Blades 1 and 2 are respectively provided with projections 1a and 2a extending perpendicularly therefrom to cooperate with the flash synchronizing device. In FIG. 1 and 3, only the projection 1a is visible, the other projection being hidden behind it. The switch element assembly $S_1$ and $S_2$ has a first resilient contact 4 arranged to serve as a brake when the projection 2a of the opening shutter blade while running down arrives at a point near the terminal position of the running-down movement thereof, and has a second contact 3 which is common to the first and second switch elements $S_1$ and $S_2$. The second contact 3 has two arms 3a and 3b, the arm 3a of which extends into the path of movement of the first resilient contact 4 to constitute the first switch element $S_1$ which is closed when the running-down movement of the opening shutter blade 2 is terminated, and the other of which the arm 3b is resilient and extends into a space between a fixed third contact 5 and one arm 6a of a lever 6 to constitute the second switch element $S_2$ which is normally closed and is opened when the closing blade 1 starts to running-down movement, as the lever 6 is pivoted about a shaft 7 under the action of force of arm 3b by disengagement at the other arm end 6b from the projection 1a. The lever 6 is made of an insulating material, and all the contacts 3, 4 and 5 are electrically insulated from one another and from the housing of the device and the shutter 1 and 2. The switch elements $S_1$ and $S_2$ are connected in series with each other to a flash tube not shown.

Figure 4:
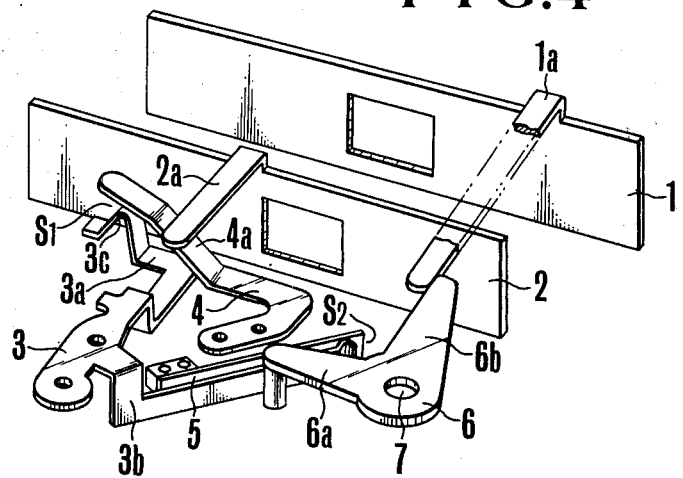
FIG. 4 is a perspective view of the flash synchronizing device of FIGS. 1, 2 and 3 with the shutter blades being shown in an exploded view and in an operative position where the opening blade is being subjected to the braking action of a resilient contact of the device just before the termination of running-down movement of the opening blade.

In the operation of the device of FIGS. 1 through 4 for flash photography, the shutter 1 and 2 and the flash synchronizing device 3 through 7 are initially in the cocked position of the shutter as shown in FIG. 1. When a shutter release button not shown is depressed to make an exposure, the opening shutter blade 2 begins to run down in the direction opposite to that indicated by arrow A (FIG. 3), leaving the lever 6 stationary in the illustrated position of FIG. 1, as the lever 6 is yet latched by the projection 1a of the closing blade 1 to maintain the second switch element $S_2$ in the closed position. As the opening shutter blade 2 moves, the projection 2a is brought into braking engagement with the resilient contact 4 at a location intermediate between the two terminal positions as shown in FIG. 4, finally reaching the terminal position shown in FIG. 2 at which the first switch element $S_1$ is closed and at which the rectangular exposure orifice provided therein is aligned with an exposure aperture in diaphragm means of the camera, thereby a flash exposure is initiated, as the first and second switch elements $S_1$ and $S_2$ are simultaneously closed to energize the flash tube. After a predetermined exposure time from the initiation of the exposure, the closing shutter blade 1 is actuated for initiation of running-down movement from the terminal position shown in FIG. 2, while permitting the lever 6 to be turned counter-clockwise about the shaft 7 under the action of the springing property of the switch contact arm 3b, thereby the second switch $S_2$ is opened to deenergize the flash tube. When the closing shutter blade 1 has reached the other terminal position shown in FIG. 3, the exposure aperture is totally blocked to terminate the flash exposure. After the exposure has been terminated, the camera operator may cock the shutter to reset the shutter blades 1 and 2 from the position shown in FIG. 3 to the position shown in FIG. 1 in a manner not to establish a closed circuit for energization of the flash tube as the second switch element $S_2$ is closed by means of lever 6 after a certain period of time from the opening of the first switch element $S_1$.

Figure 5:
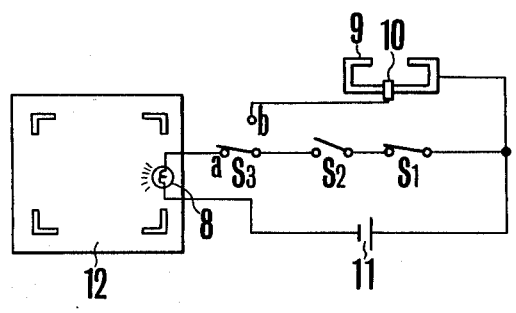
FIG. 5 is a schematic diagram of a field of view of the camera finder and an electrical circuit associated with the device for energizing and deenergizing a lamp located near the margin of the field of view of the finder to indicate whether or not the shutter is in the fully open position.

In FIG. 5, there is shown an example of utilization of the flash synchronizing device of the invention for indicating the relative positions of the shutter blades 1 and 2, as can be viewed by the camera operator looking through the view-finder 12 having a lamp 8. The lamp 8 is connected to a battery 11 through three switch elements $S_1$, $S_2$ and $S_3$ which are successively connected in series with each other to the lamp 8 and battery 11. As the first and second switch elements, use is made of the first and second switch elements of FIGS. 1 through 4 respectively. The third switch element $S_3$ is constructed in the form of a circuit-transfer switch element responsive to the attachment of a flash unit not shown to an accessary shoe 9 having an electrical interconnection terminal member 10 located at a center of the shoe 9 to be set from the $a$ position where the lamp circuit is effective to the $b$ position where the flash control circuit is made effective. Upon detachment of the flash unit from the shoe 9, the third switch element $S_3$ is set to the $a$ position, thereby the lamp 8 is connected to the battery 11. In this case, when the opening shutter blade causes the exposure to be initiated, the lamp 8 is lighted on, and when the closing blade causes the exposure to be terminated, the lamp 8 is lighted off. This lamp arrangement is advantageous in making long exposures without using the flash unit, for example, bulb exposures.

Figure 6:
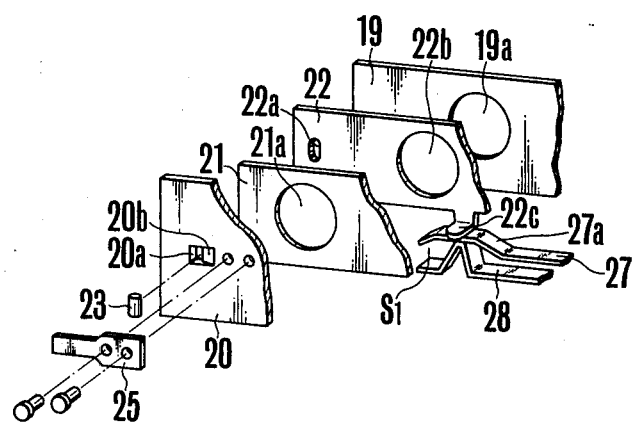
FIG. 6 is a fragmentary exploded perspective view of another embodiment of the present invention.
Figure 7:
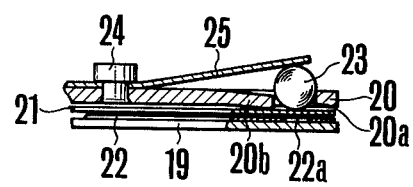
FIG. 7 is a sectional view of the embodiment of FIG. 6, with both of the shutter blades being shown in the run-down positions.
Figure 8:
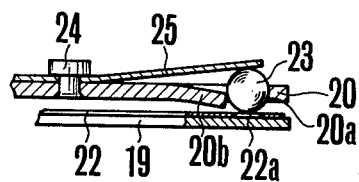
FIG. 8 is a sectional view of the embodiment of FIG. 6 with the shutter being shown in the fully open position.

Referring now to FIGS. 6, 7 and 8, there is shown another embodiment of the present invention as applied to another type shutter. The shutter comprises an opening planar opaque blade 22 and a closing planar opaque blade 21 slidably movable in a channel defined by a pair of apertured plates 19 and 20. The plate 20 is provided with a tapered rectangular hole 20a in which a roller 23 is seated and urged to rotatable engagement therewith by a band spring 25 at one end thereof, the opposite end of which is fixed to the plate 20 by rivets 24 as shown in FIGS. 7 and 8. The plate 20 is further provided with an angled-off portion 20b located adjacent the hole 20a for the purposes to be described later. The opening blade 22 is provided with a hole 22a arranged to be brought into latching engagement with the roller 23 when the running-down movement of the opening blade is terminated.

When the shutter is cocked by means of a film winding lever not shown, both of the shutter blades 21 and 22 are moved to the right as viewed in FIG. 6 and are latched in position by means not shown. In this state, the roller 23 is caused to abut the opposite plate 19 by the spring 24, and the exposure orifice 21a of the closing blade 21 is aligned with the aperture 19a of the plate 19, but the exposure orifice 22b of the opening blade 22 is aligned out of the aperture 19a to block the exposure aperture. Next, when a shutter release button not shown is depressed, the opening blade 22 is caused to run down in a direction to the left as viewed in FIG. 6 under the force of a driving spring not shown to a terminal position at which the exposure orifice of the opening blade is aligned with the aperture 19a as well as with the orifice 22b, thereby an exposure is initiated. In the course of the running-down movement of the opening blade 22, just before the blade 22 reaches the terminal position, the leading edge of the blade 22 is brought into braking engagement with the roller 23 and thereafter the blade 22 continues to run down at ever-decreasing speeds while rotating the roller 23 until the hole 22a engages the roller 23 under the action of the spring 25. The resultant arrangement of the various parts is shown in FIG. 8. After a certain period of time from the initiation of exposure, the closing shutter blade 21 runs down to terminate the exposure. In this course of running-down movement, the leading edge of the closing blade 21 likewise undergoes the braking action of the roller 23 as abutting against the opening shutter blade 22 just before it reaches the terminal position. The resultant arrangement of the various parts is shown in FIG. 7. The closing blade may be provided with a hole equivalent in function to that 22a of the opening blade 22.

Although there is provided a sufficient gap between the plates 19 and 20 to minimize the frictional force of the shutter blades 21 and 22 as they move slidably therethrough, the leading edge of each of shutter blades 21 and 22 tends to strike the roller 23 at a point near the center thereof. When the case is so, the possibility of occurrence of rebounding phenomena becomes considerably large. In order to prevent such rebounding phenomena, the plate 20 is provided with the angled-off portion 20b as guiding the leading edge of the blade away from the center of the roller 23 toward the opposite plate 19.

Another factor of decreasing the reliability of the shutter blade operation control is that, as the braking force of the spring 25 exerted on the closing blade 21 is larger than that exerted on the opening blade 22, the closing blade 21 tends to stop in engagement with the roller 23, not reaching the terminal position. In this case, the exposure aperture can not be totally blocked by the closing blade 21 particularly when the exposure aperture in the diaphragm means is relatively large in size. This may be overcome by selecting a spring having a weaker force for employment as the spring 25. But this in turn calls for a decrease in the braking force of the spring 25 applied on the opening blade 22.

According to another embodiment of the present invention, therefore, the above mentioned disadvantageous factors have been eliminated by utilizing the springing characteristics of the first contact of the flash synchronizing device of FIGS. 1 through 4 in effecting a good balance between the braking actions on the opening and closing blades 22 and 21.

As shown in FIG. 6, the opening blade 22 is provided with a projection 22c equivalent in function to that 2a of the blade 2 of FIG. 1 and arranged to cooperate with the first switch element having a resilient contact 27 and a fixed contact 28 equivalent in function to the parts 4 and 3a of the first switch element of FIG. 1 respectively in a manner similar to that shown in connection with the first embodiment of the invention. In this arrangement of FIG. 6, as the opening shutter blade 22 runs down from the shutter-cocked position to the unblocking position, the projection 22c is brought into braking engagement with the first contact 27 at a time almost near the time the leading edge of the opening blade 22 is brought into braking engagement with the roller 23, and thereafter the opening blade 22 continues to run down while still being subjected to braking forces from both of the bent-off portion of 27a of the resilient contact 27 and the spring-biased roller 23. When the hole 22a of the opening blade 22 is engaged with the roller 23, the contact 27 is brought into electrical contact with the fixed contact 28 to energize the flash tube associated with the camera. When the closing blade 21 runs down to the terminal position, it is subjected to a braking action almost equal to that on the opening blade only from the spring-biased roller 23 despite of the fact that the force of spring 24 is maintained constant during the shutter operation. It will be appreciated that the operation of shutter blades can be carried out with improved reliability by applying well-balanced braking forces on the two shutter blades without the necessity of using any particularly complicated supplementary means.

What is claimed is:

1. In a camera having a slit type shutter including opening and closing blades for performing a run-down movement to permit temporary passage of light, a flash synchronizing device comprising three contacts, the first and second contacts constituting a first switch element and the second and third contacts constituting a second switch element, said first switch element being arranged to cooperate with said opening blade in such a manner that when the movement of said opening blade is terminated, said first contact is brought into contact with the said second contact, and said second switch element being arranged to cooperate with said closing blade in such a manner that when said closing blade begins to run down, said third contact is taken out of contact with said second contact, said switch elements being connected in series so as to disable a flash when one of the switch elements is open.

2. In a camera having a slit type shutter including opening and closing blades, a flash synchronizing device comprising three contacts, the first and second contacts constituting a first switch element and the second and third contacts constituting a second switch element, said first switch element being arranged to cooperate with said opening blade in such a manner that when the running-down movement of said opening blade is terminated, said first contact is brought into contact with the said second contact, and said second switch element being arranged to cooperate with said closing blade in such a manner that when said closing blade begins to run down, said third contact is taken out of contact with said second contact, said opening blade having a projection arranged to be brought into braking engagement with said second contact at a point near the unblocking position of said opening blade, as said second contact acts as a resilient member for said projection.

3. In claim 2, there is further provided a switching member arranged to cooperate with said second switch element in such a manner that when said closing blade is in the unblocking position, said second switch element is closed in engagement with a projection extending from said closing blade.

4. For an electronic flashlight provided in a photographic camera equipped with a slit type shutter including a first shutter blade or diaphragm movable from a closed to a fully open position and a second shutter blade or diaphragm following up said first shutter blade or diaphragm to run from an initial aperture opening position to closed aperture position, a flash synchronizing device, comprising a first switch element coupled to said first shutter blade and adapted to be closed upon said blade or diaphragm reaching the fully open aperture position, a second switch element coupled to said second shutter blade and adapted to close when the second blade is in the initial position and open after the blade leaves the initial aperture opening position, said first switch element forming a spring contact composed of a first contact segment and a second contact segment, said second switch element forming a spring contact composed of a third contact segment and a second contact segment common to said first and second switch elements, said switch elements being connected in series with each other.

5. A flash synchronizing device for an electronic flashlight according to claim 4, further comprising an indicator lamp circuit and a third switch element to connect said first and second switch elements with an indicator lamp circuit.

* * * * *